US009656841B2

(12) United States Patent
Madron

(10) Patent No.: US 9,656,841 B2
(45) Date of Patent: May 23, 2017

(54) FIRE TUBE IMPLEMENT, SYSTEM, AND METHOD

(71) Applicant: Phil Madron, Carlsbad, NM (US)

(72) Inventor: Phil Madron, Carlsbad, NM (US)

( * ) Notice: Subject to any disclaimer, the term of this patent is extended or adjusted under 35 U.S.C. 154(b) by 0 days.

(21) Appl. No.: 14/838,616

(22) Filed: Aug. 28, 2015

(65) Prior Publication Data

US 2016/0096713 A1    Apr. 7, 2016

Related U.S. Application Data

(60) Provisional application No. 62/060,313, filed on Oct. 6, 2014.

(51) Int. Cl.
*B66F 9/18* (2006.01)
*B66F 9/12* (2006.01)
*B66C 1/56* (2006.01)

(52) U.S. Cl.
CPC ............... *B66F 9/122* (2013.01); *B66C 1/56* (2013.01); *B66F 9/185* (2013.01); *B65G 2201/0276* (2013.01)

(58) Field of Classification Search
CPC ... B66C 1/54; B66C 1/56; B66F 9/122; B66F 9/185; B65G 2201/0276
USPC .............................. 294/97; 414/453, 910, 911
See application file for complete search history.

(56) References Cited

U.S. PATENT DOCUMENTS

| | | | | |
|---|---|---|---|---|
| 2,759,757 A | * | 8/1956 | Pace | B66C 1/54 294/93 |
| 2,841,300 A | * | 7/1958 | Berquist | B66F 9/185 294/97 |
| 2,879,101 A | * | 3/1959 | Daroci | B25B 27/02 254/29 R |
| 3,691,334 A | | 9/1972 | Hoffman | |
| 3,730,368 A | * | 5/1973 | Dalglish | B66F 9/18 414/621 |
| 4,245,861 A | * | 1/1981 | Harry | B66C 1/54 294/67.2 |
| 4,283,826 A | | 8/1981 | Miller | |

(Continued)

FOREIGN PATENT DOCUMENTS

| CN | 89209568 U | 11/1990 |
|---|---|---|
| CN | 202278259 U | 6/2012 |
| EP | 0903537 A2 | 3/1999 |

OTHER PUBLICATIONS

International Search Report and Written Opinion of PCT/US15/54280 mailed Jan. 4, 2016, 5 pps.

*Primary Examiner* — Dean Kramer
(74) *Attorney, Agent, or Firm* — Dentons US LLP

(57) ABSTRACT

Some illustrative embodiments of a fire tube implement for extraction and insertion of a fire tube may include an elongate shaft that is configured to extend outward and to be received within an opening in the fire tube. In some embodiments, the elongate shaft may carry at least one extender that is moveable between an extended position and a retracted position normal to a longitudinal axis of the elongate shaft. The at least one extender may be configured to engage an internal surface of the fire tube within the opening when the at least one extender is in the extended position. In some embodiments, a stabilizer may be laterally disposed from an exterior surface of the elongate shaft and securable to the fire tube. The elongate shaft may be operable by a powered machine.

24 Claims, 11 Drawing Sheets

(56) References Cited

U.S. PATENT DOCUMENTS

| | | | |
|---|---|---|---|
| 4,312,124 A | | 1/1982 | Calhoun |
| 4,320,915 A | * | 3/1982 | Abbott ...................... B66C 1/56 |
| | | | 294/86.15 |
| 4,515,522 A | * | 5/1985 | Sonerud ................... B66C 1/24 |
| | | | 294/104 |
| 4,557,515 A | * | 12/1985 | Read ..................... B21C 47/242 |
| | | | 294/67.22 |
| 4,685,711 A | * | 8/1987 | Zuber ....................... B66C 1/54 |
| | | | 294/67.22 |
| 4,702,692 A | | 10/1987 | Burns et al. |
| 5,468,116 A | * | 11/1995 | Reichert ................. B66F 9/185 |
| | | | 414/607 |
| 5,893,209 A | | 4/1999 | Weeks et al. |
| 5,974,642 A | | 11/1999 | Weeks et al. |
| 6,174,125 B1 | * | 1/2001 | Davis ..................... B66F 9/185 |
| | | | 294/93 |
| 7,093,360 B1 | | 8/2006 | Craig |
| 2012/0180996 A1 | | 7/2012 | Chadwick |
| 2013/0223826 A1 | | 8/2013 | Bruce et al. |

* cited by examiner

FIRE TUBE IMPLEMENT, SYSTEM, AND METHOD

CROSS-REFERENCE TO RELATED APPLICATIONS

This application claims the benefit of, and priority to, co-pending U.S. Provisional Patent Application Ser. No. 62/060,313, filed on Oct. 6, 2014, the entire content of which is hereby incorporated by reference.

FIELD

This disclosure relates generally to oil field servicing equipment and, more particularly, but not by way of limitation, to devices, systems, and methods for moving a fire tube relative to a heater treater.

BACKGROUND

Tank batteries or tank farms servicing an oil field may include a heating element, such as a heater treater, for separating fluids extracted from an oil well. The heater treater may include a fire tube, or other heating element, for supplying heat to the heater treater and the contents thereof.

A fire tube may require periodic cleaning, maintenance, or replacement. These activities typically require removal of the fire tube. However, fire tubes are typically very heavy, such as 800 pounds or more, and can be difficult to access within the heater treater. Some fire tubes may also have delicate coatings for use in corrosive environments. These and other factors can make extraction, insertion, and positioning of a fire tube difficult to perform in a safe manner and without damage to the fire tube. Many injuries occur each year to oil field service workers when servicing the fire tube as a result of fingers or hands being pinched by the fire tube and heater treater in which the fire tube resides. Thus, improvements to devices, systems, and methods for the positioning or manipulation of a fire tube relative to a heater treater may be desirable.

SUMMARY

Shortcomings with certain aspects of devices, systems, and methods for positioning a fire tube are addressed as shown and described in a variety of illustrative, non-limiting embodiments herein.

In some illustrative embodiments, an implement for extraction and insertion of a fire tube associated with a heater treater may include an elongate shaft, an extender, and an actuator. The elongate shaft may include an exterior surface and a longitudinal axis. The extender may be carried by the elongate shaft and be moveable between an extended position and a retracted position normal to the longitudinal axis of the elongate shaft. A portion of the extender may be outwardly disposed from the exterior surface of the elongate shaft when the extender moves toward the extended position. The actuator may be configured to move the extender between the retracted position and the extended position.

In some illustrative embodiments, an implement for extraction and insertion of a fire tube associated with a heater treater may include an elongate shaft and a stabilizer. The elongate shaft may include an exterior surface, a mounting end, and an insertion end opposing the mounting end. The insertion end may be configured to be received by an opening of the fire tube. The stabilizer may be positioned proximate the mounting end of the elongate shaft and laterally disposed from the exterior surface of the elongate shaft.

In some illustrative embodiments, a system for extraction and insertion of a fire tube may include a powered machine, an elongate shaft, and an extender. The elongate shaft may be configured to extend outward from the powered machine and to be received by an opening of the fire tube. The elongate shaft may include an exterior surface and a longitudinal axis. The extender may be carried by the elongate shaft and be moveable between an extended position and a retracted position normal to the longitudinal axis of the elongate shaft. The extender may be configured to engage an internal surface of the fire tube within the opening when the extender is in the extended position.

In some illustrative embodiments, a system for extraction and insertion of a fire tube may include a powered machine, an elongate shaft, and a stabilizer. The elongate shaft may include an exterior surface, a mounting end, and an insertion end opposing the mounting end. The mounting end may be coupled to the powered machine. The insertion end may extend outward and be configured to be received by an opening of the fire tube. The stabilizer may be positioned proximate the mounting end of the elongate shaft and laterally disposed from the exterior surface of the elongate shaft.

In some illustrative embodiments, a method for extraction and insertion of a fire tube associated with a heater treater may include extending an elongate shaft coupled to a powered machine into an opening of the fire tube. The method may further include engaging an extender from the elongate shaft with an internal surface of the fire tube. The fire tube may be moved relative to the heater treater while the extender is engaged with the fire tube.

In some illustrative embodiments, a method for extraction and insertion of a fire tube associated with a heater treater may include extending an elongate shaft coupled to a powered machine into an opening of the fire tube. The method may further include engaging the elongate shaft with an internal surface of the fire tube. The fire tube may be moved relative to the heater treater while the elongate shaft is engaged with the fire tube. Rotation of the fire tube may be prevented prior to and during moving the fire tube relative to the heater treater.

In one aspect of the disclosure, a method of moving a fire tube in relation to a heat treater is disclosed. The method includes inserting a shaft of an implement into the fire tube, contacting an inner surface of the fire tube with an exterior portion of the shaft, inhibiting rotational movement of the fire tube in relation to the implement, and moving the fire tube via movement of the implement.

In another aspect of the disclosure, an implement is disclosed for use in moving a fire tube in relation to a heat treater. The implement includes a frame extending along a first axis, a shaft extending from the frame along a second axis, and a stabilizer extending from the frame that is configured to inhibit rotation of the fire tube when the implement is employed to move the fire tube.

In another aspect of the present disclosure, a system is disclosed for use in moving a fire tube in relation to a heat treater that includes a powered machine, and an implement that is supportable by the powered machine. The implement includes a frame defining a vertical longitudinal axis, a shaft extending from the frame along a first axis that is transverse in relation to the longitudinal axis of the frame, and a stabilizer extending from the frame along a second axis that is transverse in relation to the longitudinal axis of the frame.

In another aspect of the present disclosure, a method of manufacturing an implement for use in moving a fire tube in relation to a heat treater is disclosed. The method includes configuring a frame such that the frame extends along a first axis and inhibits rotation of the fire tube when the implement is employed to move the fire tube, and attaching a shaft to the frame such that the shaft extends from the frame along a second axis.

In another aspect of the present disclosure, an implement is disclosed for the extraction and insertion of a fire tube associated with a heater treater. The implement includes an elongate shaft having an exterior surface and a longitudinal axis, an extender that is carried by the elongate shaft, and an actuator.

The extender is moveable between an extended position and a retracted position normal to the longitudinal axis of the elongate shaft. A portion of the extender is disposed outwardly from the exterior surface of the elongate shaft when the extender moves toward the extended position.

The actuator is configured to move the extender between the retracted position and the extended position, and causes the extender to engage the fire tube when in the extended position.

Other aspects, features, and advantages of the illustrative embodiments will become apparent with reference to the drawings and detailed description that follow.

DETAILED DESCRIPTION OF ILLUSTRATIVE EMBODIMENTS

In the following detailed description of non-limiting, illustrative embodiments, reference is made to the accompanying drawings that form a part hereof. Other embodiments may be utilized, and logical, structural, mechanical, electrical, and chemical changes may be made without departing from the scope of the appended claims. To avoid detail not necessary to enable those skilled in the art to practice the embodiments described herein, the description may omit certain information known to those skilled in the art. The following detailed description is non-limiting, and the scope of the illustrative embodiments are defined by the appended claims. As used herein, unless otherwise indicated, "or" does not require mutual exclusivity.

Figure 1:
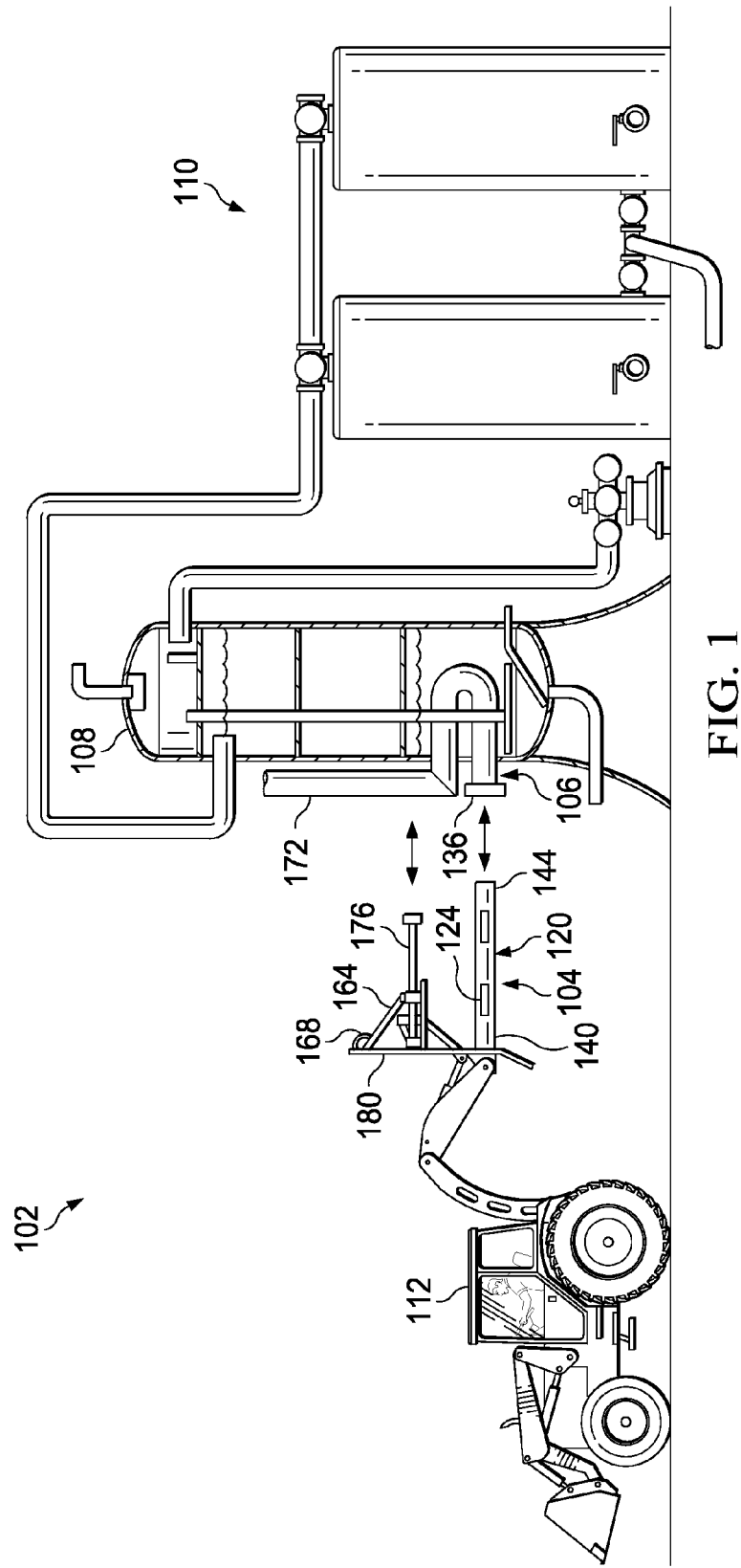
FIG. 1 is a partial cut-away view of an illustrative embodiment of a system for extraction and insertion of a fire tube depicted within a heater treater installed on a tank battery.

Referring to FIG. 1, depicted therein is an illustrative embodiment of a system 102 that may include a fire tube implement 104 for extraction and insertion of a fire tube 106. The fire tube 106, for example, may be a heating element associated with oil field equipment, such as a heater treater 108. The heater treater 108 may be located at an oil field tank battery 110, for example. Although the system 102 may be particularly suitable for use in servicing a fire tube associated with a heater treater, the system 102 may be suitable for other oil field applications, and applications in other industries.

Continuing with FIG. 1, the system 102 may include a powered machine 112 that may be operable on the fire tube implement 104. The powered machine 112 may be, for example, a back hoe, tractor, fork lift or other equipment adapted position and engage the fire tube implement 104 relative to the fire tube 106. The powered machine 112 may be moveable, and may include any suitable power system compatible with the fire tube implement 104. Such power systems may include, without limitation, a hydraulic system, an electronic solenoid, a motor, a pump, an engine, a gear drive, a transmission, a power take-off, an accessory drive, and others.

Figure 2:
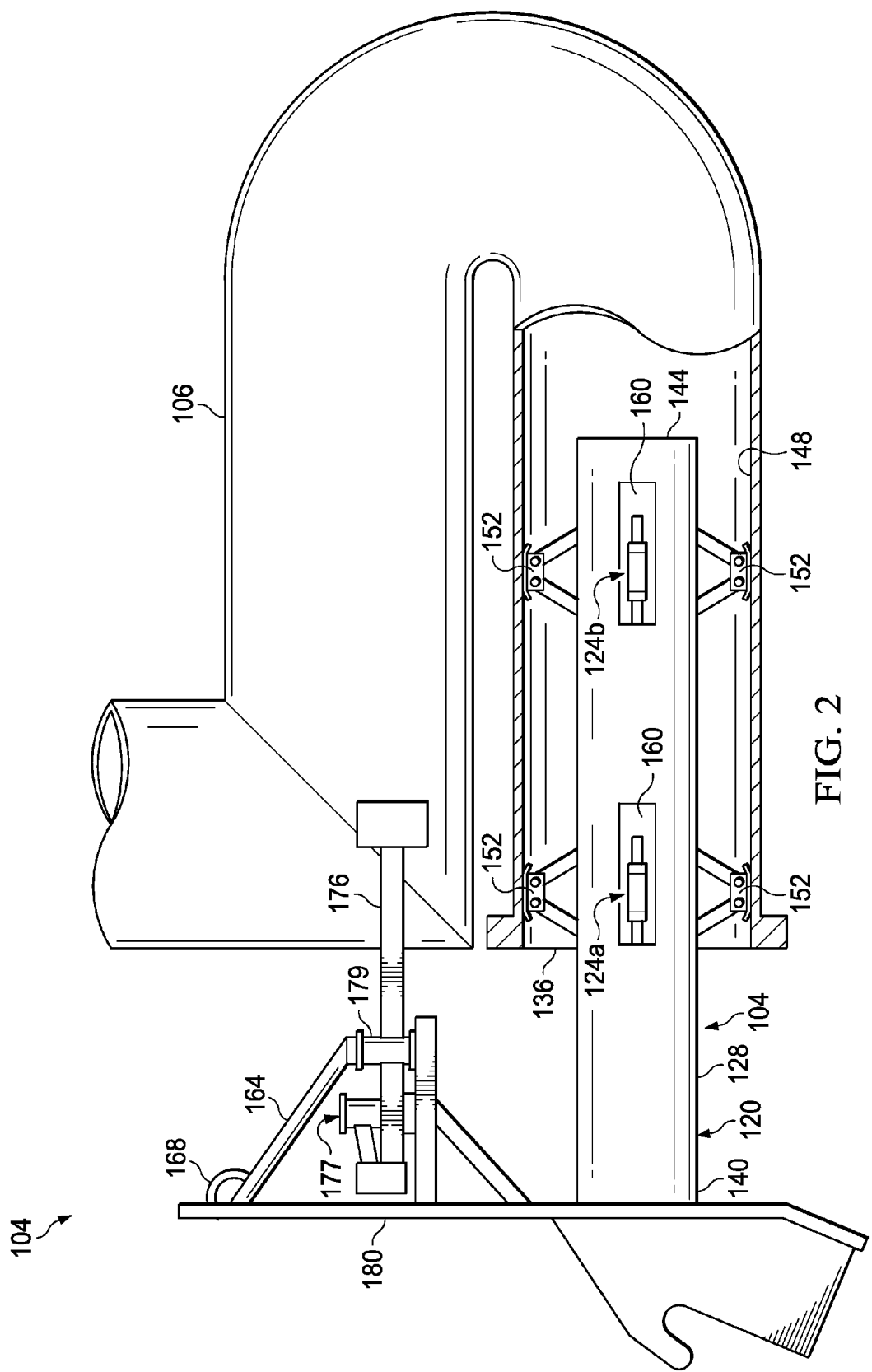
FIG. 2 is a partial cut-away view of an illustrative embodiment of a fire tube implement for extraction and insertion of a fire tube shown engaged with the fire tube.
Figure 3:
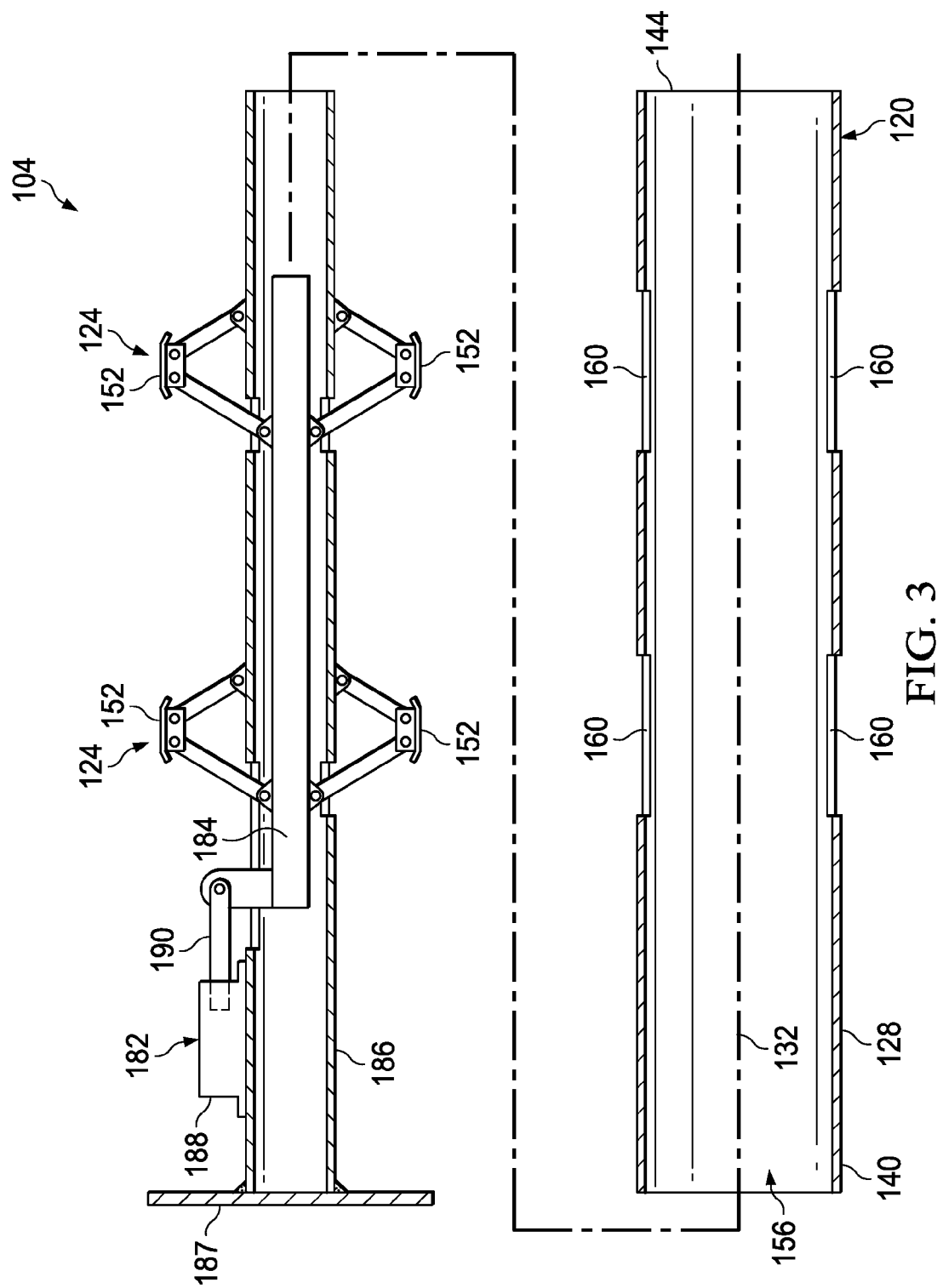
FIG. 3 is a partial exploded view of a portion of the fire tube implement of FIG. 2.

Referring to FIGS. 2-3, in some embodiments, the fire tube implement 104 may include an elongate shaft 120 and an extender 124. The elongate shaft 120 may include an exterior surface 128 and a longitudinal axis 132. The elongate shaft 120 may be configured to extend outward from the powered machine 112, and to be received by an opening 136 of the fire tube 106. The elongate shaft 120 may have a mounting end 140 and an insertion end 144 opposing the mounting end 140. The insertion end 144 of the elongate shaft 120 may be sized or otherwise configured to be received by the opening 136 of the fire tube 106. The exterior surface 128 of the elongate shaft 120 may be sized or otherwise configured to be slidably received by the opening 136 of the fire tube 106. In some embodiments, the elongate shaft 120 may be a hollow tube or a pipe, for example, and may comprise a high tensile strength steel. In some embodiments, the elongate shaft 120 may have an external diameter between about 10 inches to about 16 inches.

The extender 124 may be carried by the elongate shaft 120 and be moveable between an extended position, shown in FIG. 2, and a retracted position, shown in FIG. 1, normal to the longitudinal axis 132 of the elongate shaft 120. In one embodiment, the extender 124 may travel between about 8 inches to about 12 inches between the retracted position and the extended position. The elongate shaft 120 may be received within the opening 136 of the fire tube 106 when the extender 124 is moved toward the retracted position. The extender 124 may be configured to engage an internal surface 148 of the fire tube 106 within the opening 136 when the extender 124 is in the extended position. In some embodiments, a portion of the extender 124 may be outwardly disposed from the exterior surface 128 of the elongate shaft 120 when the extender 124 moves toward the extended position, as shown in FIG. 2.

The extender 124 may reside or be positioned below the exterior surface 128 of the elongate shaft 120 when the extender 124 is in the retracted position. In other embodiments, the extender 124 may be positioned at or substantially flush with the exterior surface 128 of the elongate shaft 120 when the extender 124 is in the retracted position. Further, in some embodiments, the extender 124 may form a portion of the exterior surface 128 of the elongate shaft 120. The extender 124 may carry an engagement shoe 152 configured to engage the internal surface 148 of the fire tube 106 when the extender 124 moves toward the extended position.

The extender 124 may be moveably coupled in an internal housing 156 of the elongate shaft 120. An extender aperture 160 may be disposed through the exterior surface 128 and into the internal housing 156 of the elongate shaft 120, and the extender 124 may be configured to extend through the extender aperture 160 when the extender 124 moves toward the extended position.

In some embodiments, the extender 124 may be a plurality of extenders 124. The plurality of extenders 124 may be positioned substantially equidistant about the longitudinal axis 132 of the elongate shaft 120. In some embodiments, the plurality of extenders 124 may be alternatively or additionally positioned along a length of the elongate shaft 120. Further, in some embodiments, a first extender 124a of the plurality of extenders 124 may be positioned about 180 degrees around the elongate shaft 120 from a second extender 124b of the plurality of extenders 124 such that the first extender 124a is moveable in an opposite direction from the second extender 124b. With the first extender 124a being moveable in an opposite direction from the second extender 124b, the travel of the first extender 124a and the second extender 124b from the retracted position to the extended position may be combined to provide a fully extended width or dimension between the first 124a and the second 124b extender of about 18 inches to about 28 inches. However, smaller or larger dimensions may be provided as desired for various applications and fire tube sizes. It should be understood that alternative mechanical configurations may be utilized that causes the extender(s) to have alternative actuation motions.

Continuing with FIGS. 2-3, in some embodiments, the fire tube implement 104 may include a stabilizer 164 that may be positioned proximate the mounting end 140 of the elongate shaft 120 and laterally disposed from the exterior surface 128 of the elongate shaft 120. In some embodiments, the stabilizer 164 may include a tethering device 168, such as, without limitation, a ring, hole, aperture, loop, support bar, or similar structure capable of accepting a chain, a rope, or similar securing apparatus for securing the fire tube 106 relative to the fire tube implement 104. For example, the fire tube 106 may have a flue 172, shown in FIG. 1, that can be chained, tied, or lashed in any suitable manner to the stabilizer 164 to prevent the fire tube from rotating during extraction, movement, and insertion.

In other embodiments, the stabilizer 164 may alternatively or additionally include a grasping arm 176, or a set of grasping arms 176, that may be pivotally positioned relative to the elongate shaft 120. The grasping arms 176 may be powered or manually moveable, and may be configured to grasp or secure a portion of the fire tube 106, such as the flue 172. In some embodiments, a plunger assembly 177 may be operable on a pivot connection or fulcrum 179 that pivotally couples the grasping arms 176 relative to the elongate shaft 120. The plunger assembly 177 may generate translational or rotational movement that may impart pivotal movement of the grasping arms 176 relative to the fulcrum 179 and the elongate shaft 120. The plunger assembly 177 may be hydraulically, electronically, or mechanically powered in any suitable manner without limitation. The stabilizer 164 may be used additionally or alternatively to the extenders 124 as described herein for securing and precluding rotation of the fire tube 106 relative to the fire tube implement 104.

In some embodiments, the fire tube implement 104 may include a frame 180 that may be configured to be coupled between the elongate shaft 120 and the powered machine 112. For example, the frame 180 may have, without limitation, any suitable shape, adaptor, bracket, or other configuration for securing the frame 180 to a portion of the powered machine 112, such as the bucket attachment on a back hoe. The mounting end 140 of the elongate shaft 120 may be coupled to the frame 180, and the insertion end 144 of the elongate shaft 120 may extend outward from the frame 180. In some embodiments, the stabilizer 164 and the mounting end 140 of the elongate shaft 120 may be coupled to the frame 180.

Referring to FIG. 3, in some embodiments, the fire tube implement 104 may include an actuator 182 configured to move the extender 124 between the retracted position and the extended position. The actuator 182 may be positioned within the internal housing 156 of the elongate shaft 120. For example, a linkage 184 may be coupled between the actuator 182 and the extender 124, and the actuator 182 may be operable on the linkage 184 for moving the extender 124 between the retracted position and the extended position.

In some embodiments, the fire tube implement 104 may include a carrier 186, and the actuator 182 and the extender 124 may be coupled to the carrier 186. The carrier 186 may be sized or otherwise configured to be received within the internal housing 156 of the elongate shaft 120. For example, the carrier 186 may be a tube, pipe, or rod having a smaller external diameter or dimension than the internal housing 156. An end of the carrier 186 may be coupled to a flange 187. The flange 187 may be coupled to the mounting end 140 of the elongate shaft 120 for securing and positioning the carrier 186 within the internal housing 156. The carrier 186 may have a longitudinal axis or length positioned on or substantially aligned with the longitudinal axis 132 of the elongate shaft 120. In some embodiments, the carrier 186 may have an external diameter of about 2 inches.

In some embodiments, the actuator 182 may include an actuator housing 188 and an actuator rod 190. The actuator rod 190 may be linearly moveable relative to the actuator housing 188. The actuator rod 190 may be coupled to the linkage 184, and the actuator housing 188 may be coupled to, or stationary relative to, the carrier 186. Thus, the actuator rod 190 and the linkage 184 may be linearly moveable relative to the carrier 186 and the elongate shaft 120, and operable on the extender 124. The extender 124 may be pivotally coupled relative to the linkage 184 and/or the carrier 186 such that reciprocation or translational movement of the linkage 184 moves the extender 124 between the extended position and the retracted position. The extender 124, the actuator 182, and the linkage 184 may each be configured to be positioned within the internal housing 156 of the elongate shaft 120 on the carrier 186 as shown in FIG. 3.

In some embodiments, the actuator 182 may be hydraulically powered. A pressure regulator (not shown) may be associated with the actuator and configured to regulate an amount of hydraulic pressure being communicated to the actuator 182. Regulating the amount of hydraulic pressure supplied to the actuator may prevent damage to the fire tube 106. In other embodiments, the actuator 182 may be powered, without limitation, by an electric solenoid, gear drive, pump, or similar device. As described above, these powering devices may be supplied as part of an on-board system carried by the powered machine 112.

Figure 4:
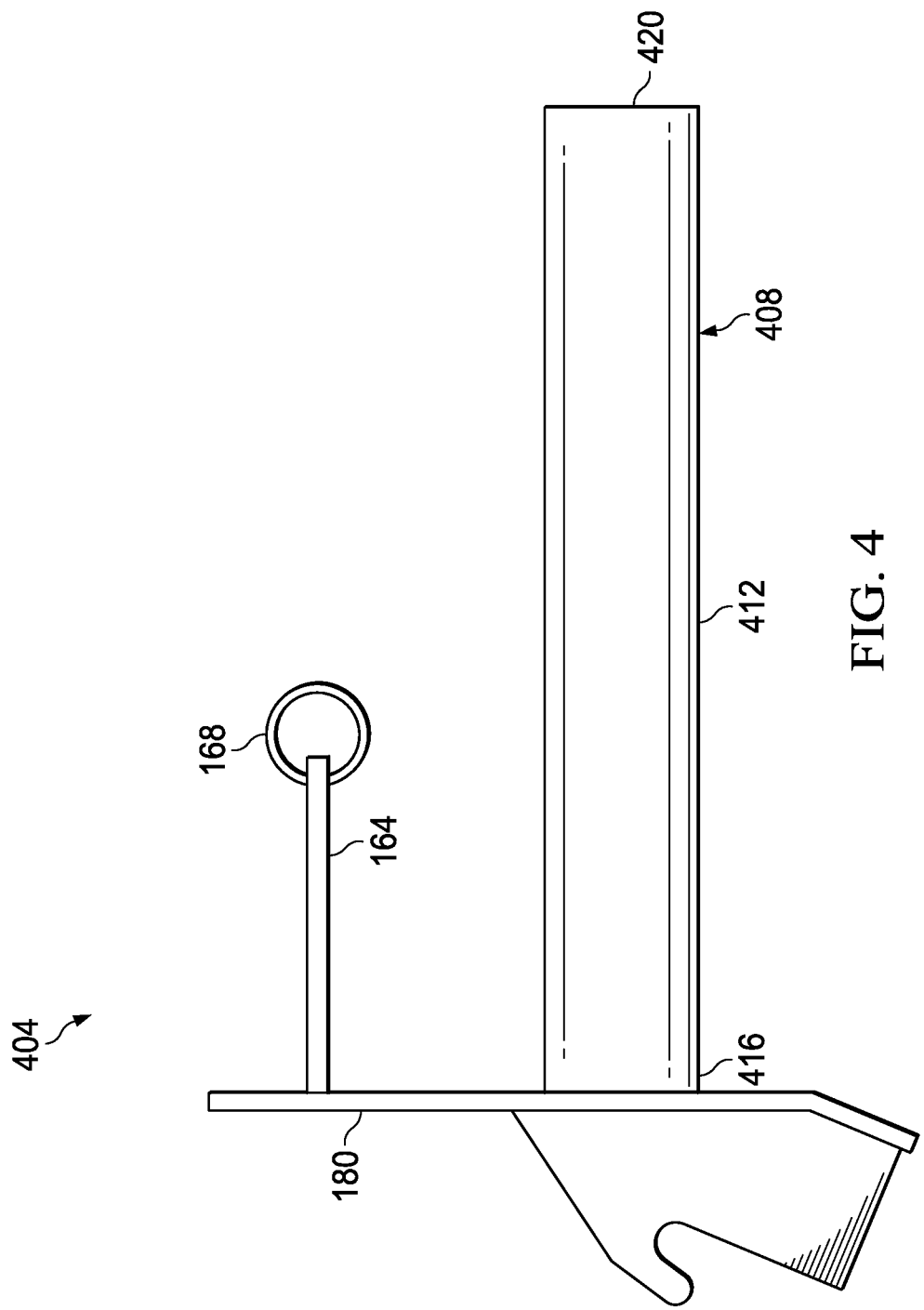
FIG. 4 depicts another illustrative embodiment of a fire tube implement for extraction and insertion of a fire tube.

Referring to FIG. 4, depicted is another illustrative embodiment of a fire tube implement 404 suitable for extraction and insertion of the fire tube 106, and for use with the powered machine 112 as described above. The fire tube implement 404 may include the elongate shaft 408 and the stabilizer 164. Similar to the embodiments above, the elongate shaft 408 may include the exterior surface 412, the mounting end 416, and the insertion end 420 opposing the mounting end 416. However, as shown in the embodiment of FIG. 4, the elongate shaft 408 may be a solid elongate rod or bar. The mounting end 416 may be coupled to the powered machine 112, and the insertion end 408 may extend outward and be configured to be received by the opening 136 in the fire tube 106. Similar to the previous embodiments, the frame 180 may be coupled between the elongate shaft 408 and the powered machine 112 in any suitable manner. For example, the mounting end 416 of the elongate shaft 408 may be coupled to the frame 180 and the insertion end 420 of the elongate shaft 408 may extend outward from the frame 180. The stabilizer 164 may be positioned proximate the mounting end 416 of the elongate shaft 408 and laterally disposed from the exterior surface 412 of the elongate shaft 408. The stabilizer 164 may include the tethering device 168 as described above. However, in some embodiments, the stabilizer 164 may additionally or alternatively include the grasping arm 176 in an analogous manner as the previous embodiments. As shown in FIG. 4, in some embodiments, the stabilizer 164 may be secured to the frame 180. As will be described further herein, the stabilizer 164 may be used to prevent rotation of the fire tube when being supported by the elongate shaft 408.

Figure 5:
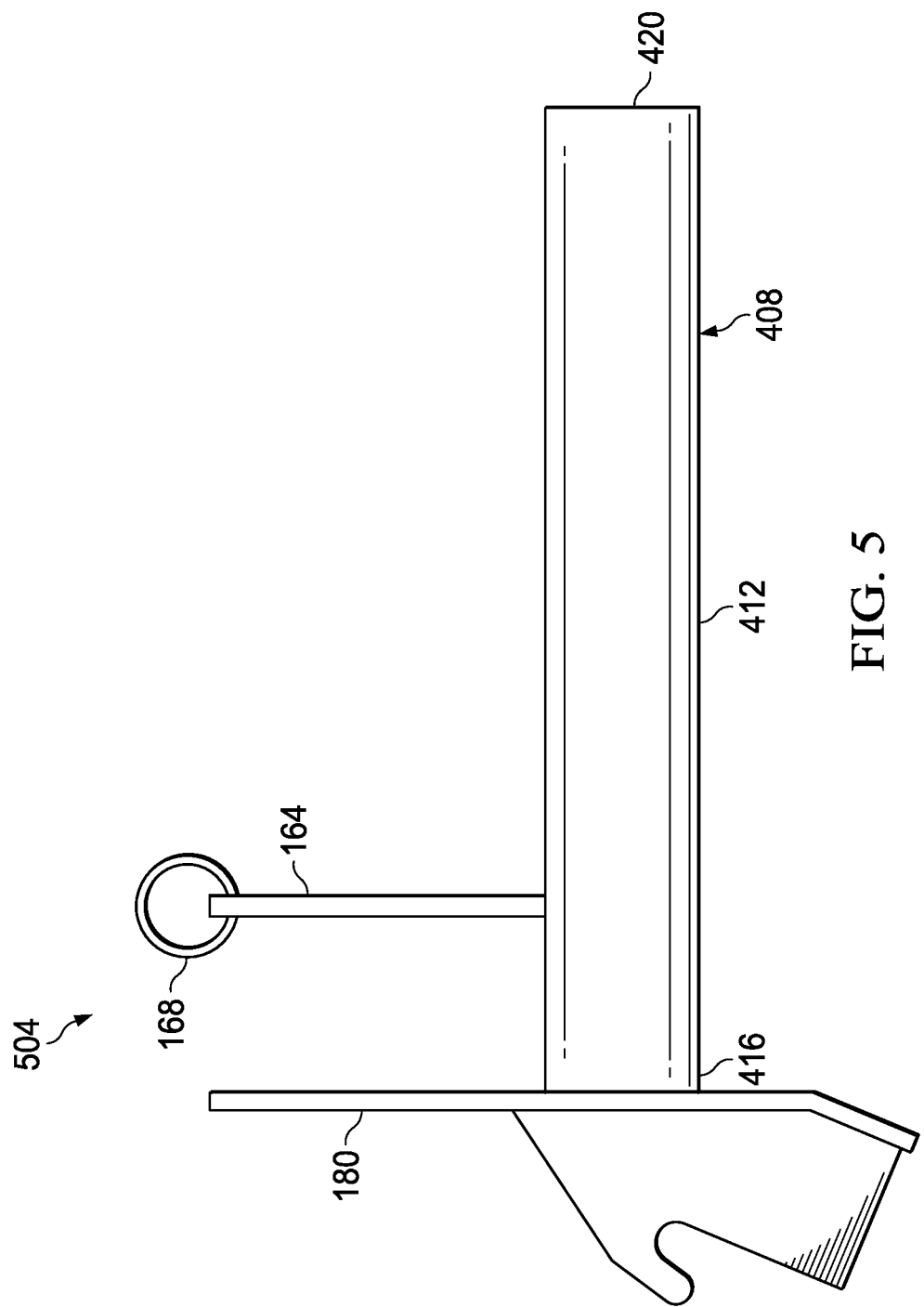
FIG. 5 depicts another illustrative embodiment of a fire tube implement for extraction and insertion of a fire tube.

Referring to FIG. 5, depicted is another illustrative embodiment of a fire tube implement 504 suitable for extraction and insertion of the fire tube 106, and for use with the powered machine 112 as described above. The fire tube implement 504 may include the elongate shaft 408 and the stabilizer 164. As with the embodiment above, the elongate shaft 408 may include the exterior surface 412, the mounting end 416, and the insertion end 420 opposing the mounting end 416. The elongate shaft 408 may be a solid elongate rod or bar. The mounting end 416 may be coupled to the powered machine 112, and the insertion end 420 may extend outward and be configured to be received by the opening 136 in the fire tube 106. Similar to the previous embodiments, the frame 180 may be coupled between the elongate shaft 408 and the powered machine 112 in any suitable manner. For example, the mounting end 416 of the elongate shaft 408 may be coupled to the frame 180, and the insertion end 420 of the elongate shaft 408 may extend outward from the frame 180. The stabilizer 164 may be positioned proximate the mounting end 416 of the elongate shaft 408 and laterally disposed from the exterior surface 412 of the elongate shaft 408. The stabilizer 164 may include the tethering device 168 as described above. In this embodiment, the stabilizer 164 and tethering device 168 may extend parallel to the frame 180. Other configurations of the stabilizer 164 and tethering device 168 are possible, as well. In some embodiments, the stabilizer 164 may additionally or alternatively include the grasping arm 176 in an analogous manner as the previous embodiments. As shown in FIG. 5, in some embodiments, the stabilizer 164 may be secured to the elongate shaft 408.

Figure 6:
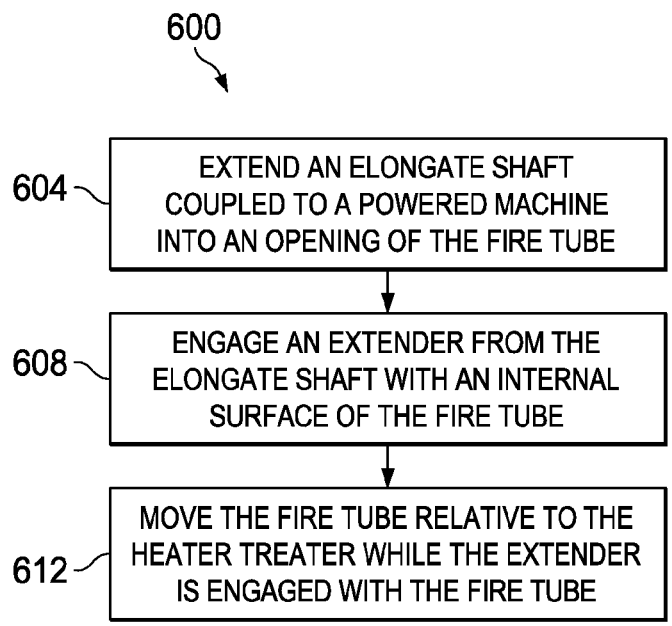
FIG. 6 is a flow chart of an illustrative embodiment of a method for extraction and insertion of a fire tube associated with a heater treater.
Figure 7:
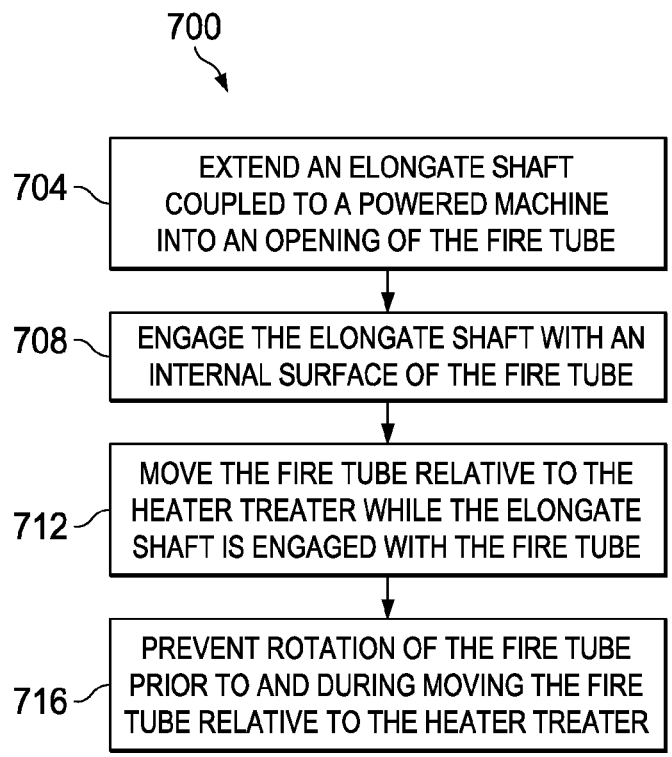
FIG. 7 is a flow chart of another illustrative embodiment of a method for extraction and insertion of a fire tube associated with a heater treater.
Figure 8A:
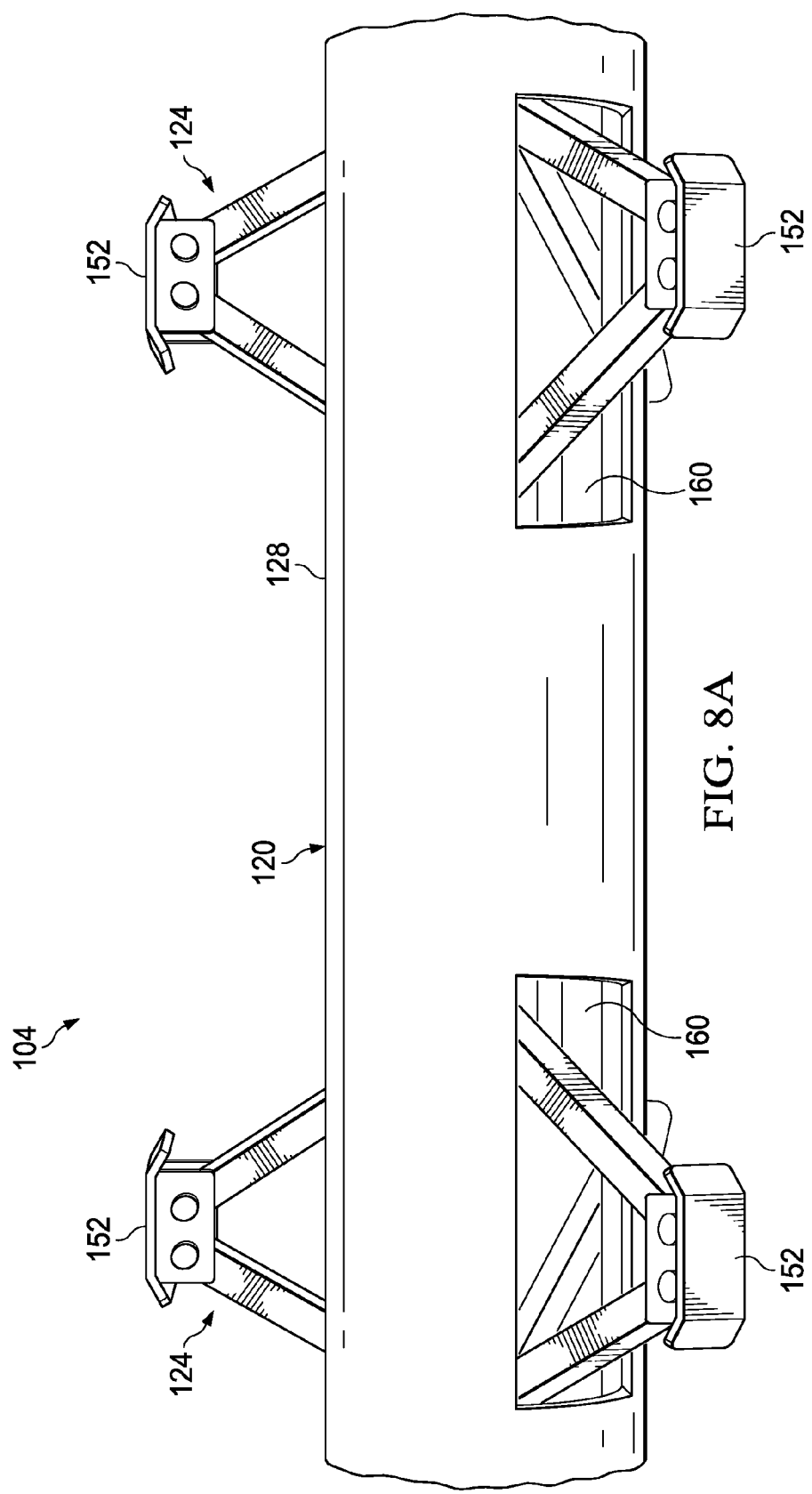
FIGS. 8A-8E are illustrations depicting multiple views of an illustrative embodiment of a fire tube implement for extraction and insertion of a fire tube according this disclosure.
Figure 8B:
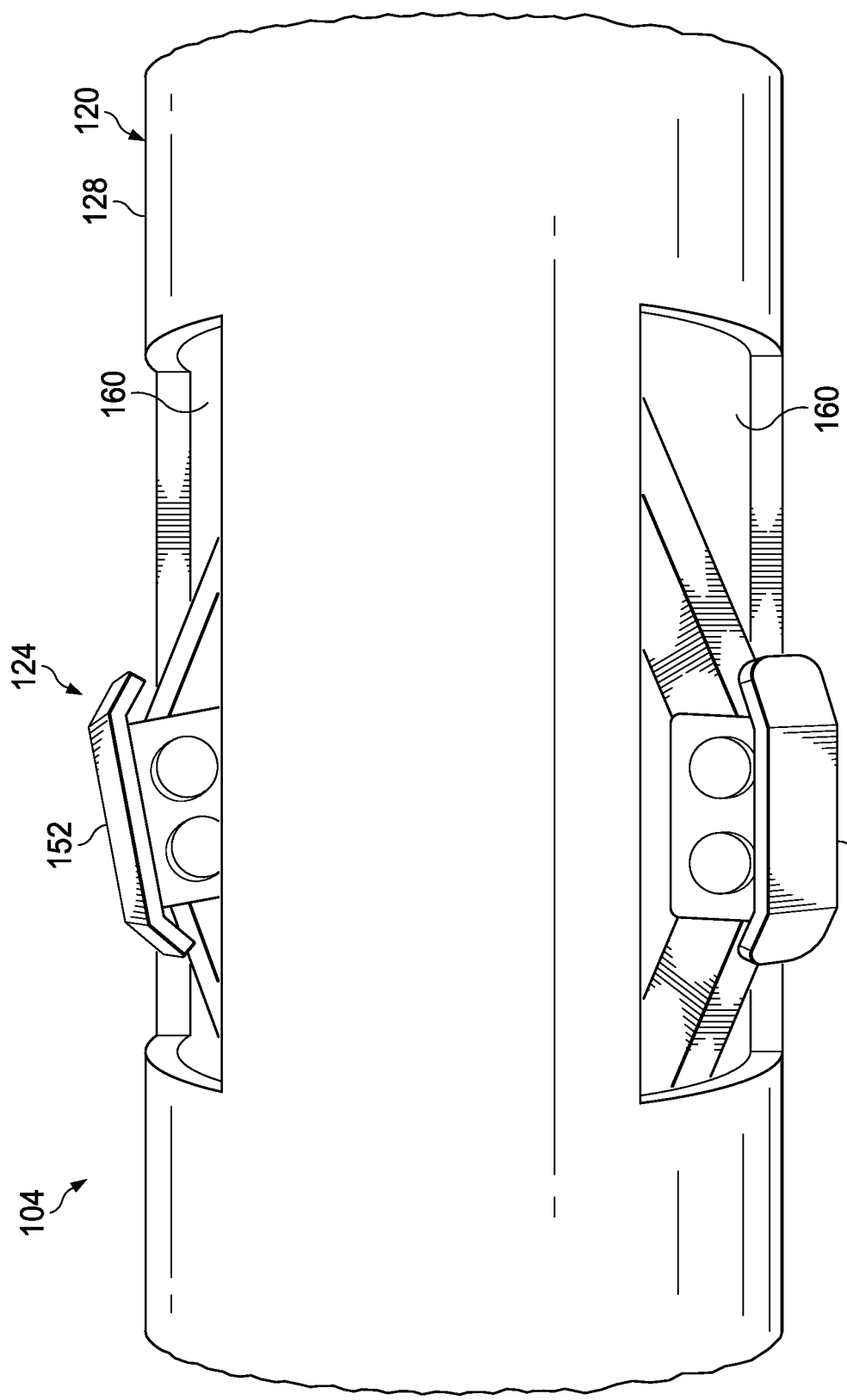
Figure 8C:
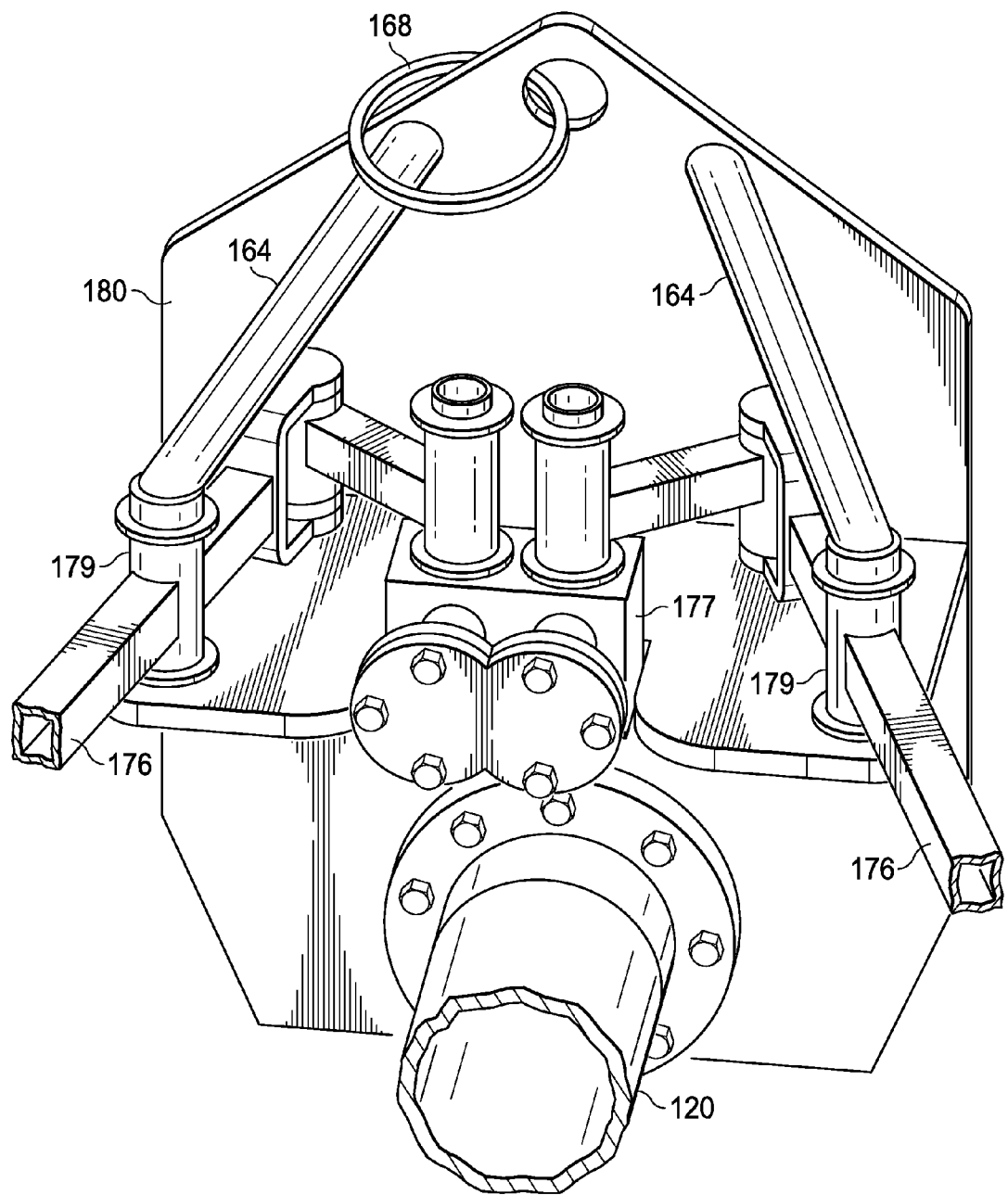
Figure 8D:
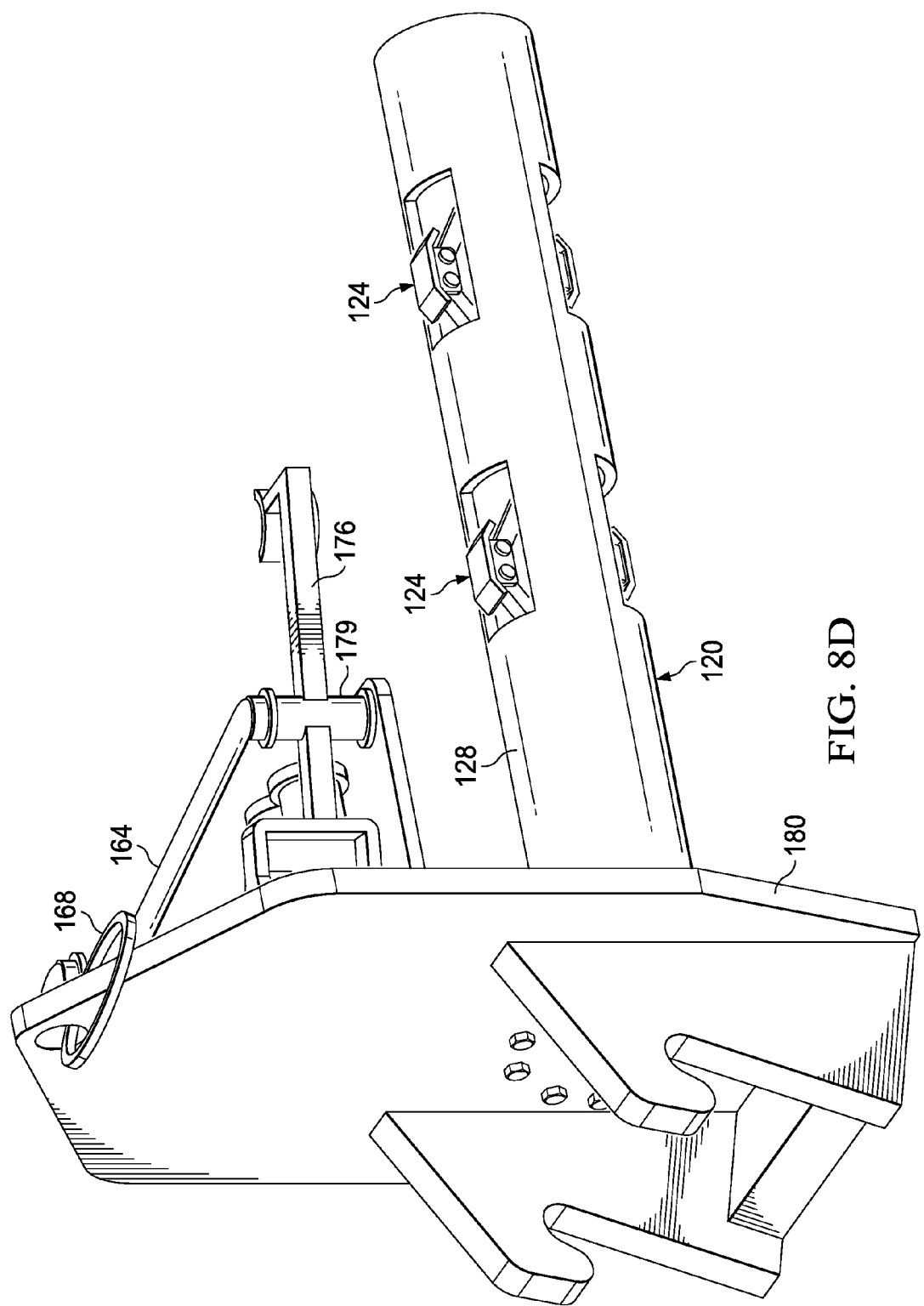
Figure 8E:
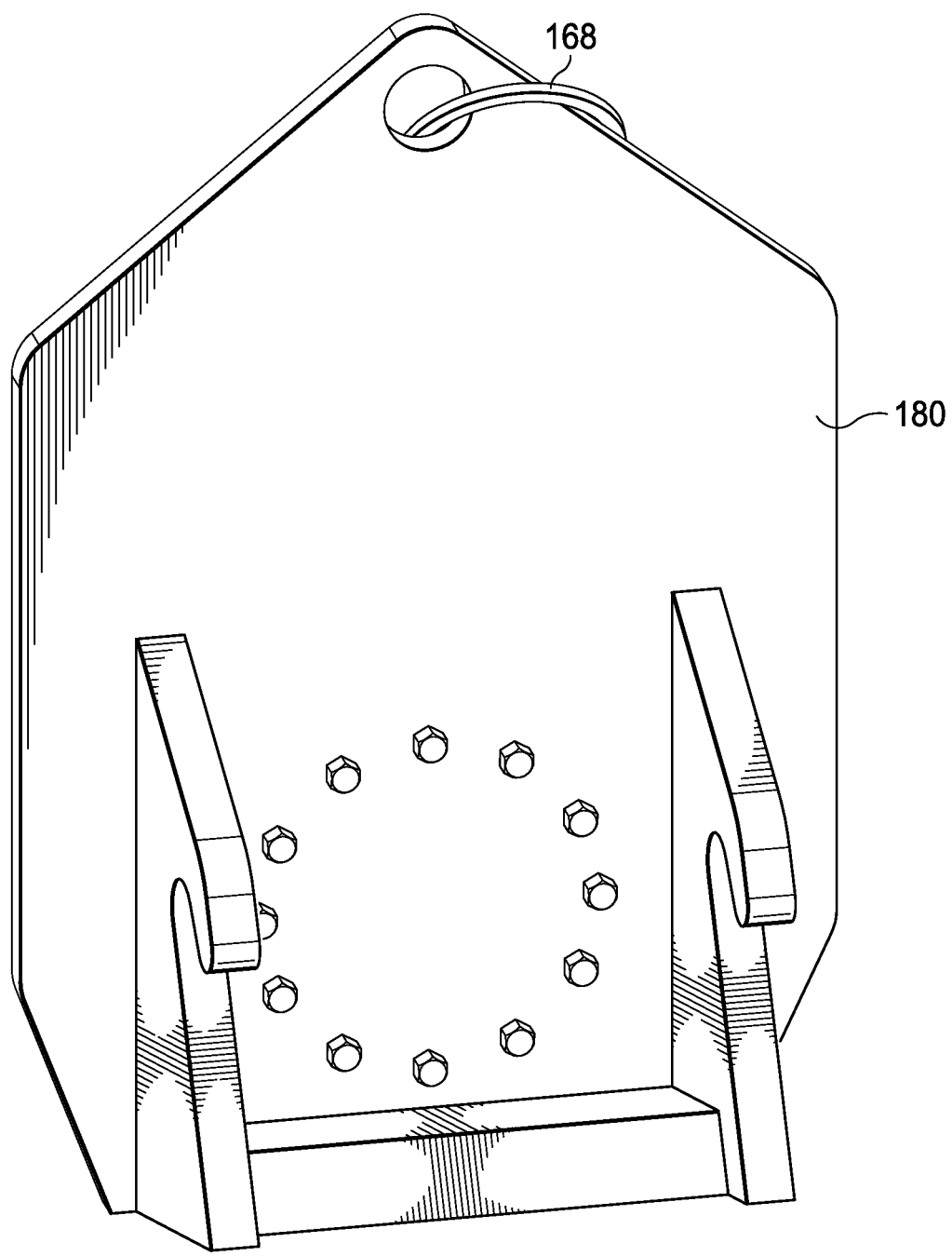

Referring to FIGS. 6-7, depicted are flow charts of illustrative embodiments of methods suitable for extraction and insertion of a fire tube that may be associated with a heater treater. Steps in the methods described herein may be performed in any suitable order without limitation unless otherwise stated. Referring to FIG. 6, in some embodiments, a method 600 for extraction and insertion of the fire tube 106 may include step 604 of extending the elongate shaft 120 into the opening 136 of the fire tube 106. The elongate shaft 120 may be coupled to the powered machine 112 in any suitable manner. Further, the method 600 may include step 608 of engaging the extender 124 from the elongate shaft 120 with the internal surface 148 of the fire tube. Step 612 of moving the fire tube 106 relative to the heater treater 108 may be performed while the extender 124 is engaged with the fire tube 106.

In some embodiments, the method 600 may include preventing rotation of the fire tube 106 prior to and during the step 612 of moving the fire tube 106 relative to the heater treater 108. Preventing rotation of the fire tube 106 may include securing the fire tube 106 to the stabilizer 164. The stabilizer 164 may be laterally disposed from the elongate shaft 120 and positioned exterior to the opening 136 of the fire tube 106. In some embodiments, preventing rotation of the fire tube 106 may include securing the flue 172 of the fire tube 106 to the stabilizer 164.

In some embodiments, the method 600 may include centering the elongate shaft 120 within the opening 136 of the fire tube 106. In some embodiments, the step 608 of engaging the extender 124 may simultaneously position the elongate shaft 120 substantially concentric with the opening 136 of the fire tube 106. In some embodiments, the step 608 of engaging the extender 124 may include applying hydraulic pressure to the actuator 182 that may be coupled to the extender 124, and regulating an amount of the hydraulic pressure applied to the actuator 182. In some embodiments, the step 608 of engaging the extender 124 may include selectably engaging the extender 124 from the elongate shaft 120 with the internal surface 148 of the fire tube 106. In some embodiments, the step 608 of engaging the extender 124 may position the elongate shaft 120 substantially concentric with the opening 136 of the fire tube 106 without interference of the powered machine 112 that may be coupled to the elongate shaft 120.

In some embodiments, the step 612 of moving the fire tube 106 relative to the heater treater 108 may include extracting the fire tube 106 from the heater treater 108. In some embodiments, the step 612 of moving the fire tube 106 relative to the heater treater 108 may include inserting the fire tube 106 into the heater treater 108. In some embodiments, the step 612 of moving the fire tube 106 relative to the heater treater 108 may include positioning the fire tube 106 relative to the heater treater 108.

Referring to FIG. 7, in some embodiments, a method 700 for extraction and insertion of the fire tube 106 may include step 704 of extending the elongate shaft 120/408 into the opening 136 of the fire tube 106. The elongate shaft 120/408 may be coupled to the powered machine 112. Further, the method 700 may include step 708 of engaging the elongate shaft 120/408 with the internal surface 148 of the fire tube 106. Further, the method 700 may include step 712 of moving the fire tube 106 relative to the heater treater 108 while the elongate shaft 120/408 is engaged with the fire tube 106. Step 716 of preventing rotation of the fire tube 106 may be performed prior to and during moving the fire tube 106 relative to the heater treater 108.

In some embodiments, the step 708 of engaging the elongate shaft 120 with the internal surface 148 of the fire tube 106 may include engaging the extender 124 from the elongate shaft 120 with the internal surface 148 of the fire tube 106.

In some embodiments, the step 712 of moving the fire tube 106 relative to the heater treater 108 may include extracting the fire tube 106 from the heater treater 108. In some embodiments, the step 712 of moving the fire tube 106 relative to the heater treater 108 may include inserting the fire tube 106 in the heater treater 108. In some embodiments, the step 712 of moving the fire tube 106 relative to the heater treater 108 may include positioning the fire tube 106 relative to the heater treater 108.

In some embodiments, the step 716 of preventing rotation of the fire tube 106 may include securing the fire tube 106 to the stabilizer 164. The stabilizer 164 may be laterally disposed from the elongate shaft 120/408 and positioned exterior to the opening 136 of the fire tube 106.

For further support, FIGS. 8A-8E are illustrations depicting multiple views of the illustrative embodiment of the fire tube implement described above in connection with FIGS. 1-3. Like reference elements appearing in FIGS. 1-3 and FIGS. 8A-8E may refer to components having similar structure and function.

An implement for the extraction and insertion of a fire tube associated with a heater treater is disclosed. The implement includes an elongate shaft having an exterior surface and defining a longitudinal axis, at least one extender carried by the elongate shaft, and an actuator.

The at least one extender is moveable between an extended position and a retracted position normal to the longitudinal axis of the elongate shaft. A portion of the at least one extender is disposed outwardly from the exterior surface of the elongate shaft when the at least one extender moves toward the extended position.

The actuator is configured to move the at least one extender between the retracted position and the extended position, and causes the at least one extender to engage the fire tube when in the extended position.

In certain embodiments, the elongate shaft may further include a mounting end and an insertion end opposing the mounting end.

In certain embodiments, the insertion end may be configured to be received within an opening of the fire tube.

In certain embodiments, the implement may further include a stabilizer that is positioned proximate to the mounting end of the elongate shaft, and laterally disposed from the exterior surface of the elongate shaft.

In certain embodiments, the stabilizer may include a tethering device.

In certain embodiments, the stabilizer may include a grasping arm that is pivotally positioned relative to the elongate shaft.

In certain embodiments, the implement may further include a frame. In such embodiments, the frame may be configured to be coupled between the elongate shaft and a powered machine. Additionally, or alternatively, the mounting end of the elongate shaft may be coupled to the frame. Additionally, or alternatively, the insertion end of the elongate shaft may extend outwardly from the frame. Additionally, or alternatively, the stabilizer and the mounting end of the elongate shaft may be coupled to the frame.

In certain embodiments, the exterior surface of the elongate shaft may be configured to be slidably received within an opening of the fire tube when the at least one extender is moved toward the retracted position.

In certain embodiments, the elongate shaft may include an internal housing. In such embodiments, the at least one extender and the actuator may be positioned within the internal housing. For example, the at least one extender may be moveably coupled in the internal housing of the elongate shaft.

In certain embodiments, the implement may further include an extender aperture disposed through the exterior surface, and into the internal housing of the elongate shaft.

In certain embodiments, the at least one extender may be configured to extend through the extender aperture when the at least one extender moves toward the extended position.

In certain embodiments, the implement may further include a carrier. In such embodiments, the actuator and the at least one extender may be coupled to the carrier.

In certain embodiments, the carrier may be configured to be received within the internal housing of the elongate shaft.

In certain embodiments, the elongate shaft may be configured as a tube.

In certain embodiments, the elongate shaft may include, e.g., be formed from, high tensile strength steel.

In certain embodiments, the at least one extender may include a plurality of extenders that are positioned substantially equidistant about the longitudinal axis of the elongate shaft.

In certain embodiments, the at least one extender may include a plurality of extenders that are positioned along a length of the elongate shaft.

In certain embodiments, the at least one extender may reside below the exterior surface of the elongate shaft when in the retracted position.

In certain embodiments, the extender may carry an engagement shoe that is configured to engage an internal surface of the fire tube when the at least one extender moves toward the extended position.

In certain embodiments, the implement may further include a linkage that is coupled between the actuator and the at least one extender.

In certain embodiments, the actuator may be operable on the linkage for moving the at least one extender between the retracted position and the extended position.

In certain embodiments, the actuator may include an actuator housing, and an actuator rod that is linearly moveable relative to the actuator housing.

In certain embodiments, the actuator rod may be coupled to the linkage.

In certain embodiments, the implement may further include a carrier. In such embodiments, the actuator housing may be coupled to the carrier. Additionally, or alternatively, the actuator rod may be linearly moveable relative to the carrier. Additionally, or alternatively, the at least one extender may be pivotal relative to the carrier.

In certain embodiments, the actuator may be hydraulically powered.

In certain embodiments, the implement may further include a pressure regulator associated with the actuator that is configured to regulate an amount of hydraulic pressure being communicated to the actuator.

An implement for extraction and insertion of a fire tube associated with a heater treater is disclosed that includes an elongate shaft, and a stabilizer.

The elongate shaft includes an exterior surface, a mounting end, and an insertion end opposing the mounting end that is configured to be received within an opening in the fire tube.

The stabilizer is positioned proximate the mounting end of the elongate shaft, and is laterally disposed from the exterior surface of the elongate shaft.

In certain embodiments, the implement may further include a frame. In such embodiments, the frame may be configured to be coupled between the elongate shaft and a powered machine. Additionally, or alternatively, the mounting end of the elongate shaft may be coupled to the frame, and the insertion end of the elongate shaft may extend outward from the frame. Additionally, or alternatively, the stabilizer and the mounting end of the elongate shaft may be coupled to the frame.

In certain embodiments, the stabilizer may include a tethering device and/or a grasping arm that is pivotally positioned relative to the elongate shaft.

In certain embodiments, the stabilizer may be configured to be secured to a flue of the fire tube.

A system for extraction and insertion of a fire tube is disclosed that includes a powered machine, an elongate shaft, and at least one extender that is carried by the elongate shaft.

The elongate shaft is configured to extend outward from the powered machine, and to be received within an opening in the fire tube. The elongate shaft includes an exterior surface, and extends along a longitudinal axis.

The at least one extender is moveable between an extended position and a retracted position normal to the longitudinal axis of the elongate shaft, and is configured to engage an internal surface of the fire tube within the opening when the at least one extender is in the extended position.

In certain embodiments, the elongate shaft further includes a mounting end configured to be coupled to the powered machine, and an insertion end opposing the mounting end that is configured to be received within the opening of the fire tube.

In certain embodiments, the exterior surface of the elongate shaft may be configured to be slidably received within the opening of the fire tube when the at least one extender is moved toward the retracted position.

In certain embodiments, a portion of the at least one extender may be outwardly disposed from the exterior surface of the elongate shaft when the at least one extender moves toward the extended position.

In certain embodiments, the at least one extender may be positioned below the exterior surface of the elongate shaft when the at least one extender is in the retracted position.

In certain embodiments, the at least one extender may be positioned at the exterior surface of the elongate shaft when the at least one extender is in the retracted position.

In certain embodiments, the at least one extender may form a portion of the exterior surface of the elongate shaft.

In certain embodiments, the at least one extender may include a plurality of extenders that are positioned substantially equidistant about the longitudinal axis of the elongate shaft.

In certain embodiments, the at least one extender may include a plurality of extenders that are positioned along a length of the elongate shaft.

In certain embodiments, the at least one extender may carry an engagement shoe that is configured to engage the internal surface of the fire tube when the at least one extender moves toward the extended position.

In certain embodiments, the system may further include a linkage and an actuator.

In certain embodiments, the linkage may be coupled between the actuator and the at least one extender.

In certain embodiments, the actuator may be operable on the linkage to move the at least one extender between the retracted position and the extended position.

In certain embodiments, the elongate shaft may include an internal housing. In such embodiments, the at least one extender, the actuator, and the linkage may be positioned within the internal housing.

In certain embodiments, the system may further include an extender aperture disposed through the exterior surface, and into the internal housing of the elongate shaft.

In certain embodiments, the at least one extender may be configured to extend through the extender aperture when the at least one extender moves toward the extended position.

A system is disclosed for extraction and insertion of a fire tube that includes a powered machine, an elongate shaft, and a stabilizer.

The elongate shaft includes an exterior surface, a mounting end coupled to the powered machine, and an insertion end opposing the mounting and extending outward that is configured to be received within an opening in the fire tube.

The stabilizer is positioned proximate the mounting end of the elongate shaft, and is laterally disposed from the exterior surface of the elongate shaft.

In certain embodiments, the system may further include a frame. In such embodiments, the frame may be configured to be coupled between the elongate shaft and the powered machine. Additionally, or alternatively, the mounting end of the elongate shaft may be coupled to the frame, and the insertion end of the elongate shaft may extend outward from the frame. Additionally, or alternatively, the stabilizer and the mounting end of the elongate shaft may be coupled to the frame.

In certain embodiments, the stabilizer may include a tethering device and/or a grasping arm that is pivotally positioned relative to the elongate shaft.

In certain embodiments, the stabilizer may be configured to be secured to a flue of the fire tube.

A method for the extraction and insertion of a fire tube associated with a heater treater is disclosed that includes extending an elongate shaft coupled to a powered machine into an opening of the fire tube, engaging at least one extender from the elongate shaft with an internal surface of the fire tube, and moving the fire tube relative to the heater treater while the at least one extender is engaged with the fire tube.

In certain embodiments, the method may further include preventing rotation of the fire tube prior to and/or during moving the fire tube relative to the heater treater.

In certain embodiments, preventing rotation of the fire tube may include securing the fire tube to a stabilizer.

In certain embodiments, the stabilizer may be laterally disposed from the elongate shaft, and positioned exterior to the opening of the fire tube.

In certain embodiments, the method may further include centering the elongate shaft within the opening of the fire tube.

In certain embodiments, engaging the at least one extender may simultaneously position the elongate shaft substantially concentric with the opening of the fire tube.

In certain embodiments, engaging the at least one extender may include applying hydraulic pressure to an actuator coupled to the at least one extender.

In certain embodiments, the method may further include regulating the amount of hydraulic pressure applied to the actuator.

In certain embodiments, engaging the at least one extender may include selectably engaging the at least one extender with the internal surface of the fire tube.

In certain embodiments, engaging the at least one extender may position the elongate shaft substantially concentric with the opening of the fire tube without interference of the powered machine coupled to the elongate shaft.

In certain embodiments, engaging the at least one extender may include engaging a plurality of extenders that are positioned substantially equidistant about a longitudinal axis of the elongate shaft.

In certain embodiments, engaging the at least one extender may include engaging a plurality of extenders that are positioned along a length of the elongate shaft.

In certain embodiments, the method may further include movably positioning the at least one extender between an extended position and a retracted position normal to a longitudinal axis of the elongate shaft.

In certain embodiments, moving the fire tube relative to the heater treater may include positioning the fire tube relative to the heater treater, e.g., inserting and/or extracting the fire tube from the heater treater.

A method for the extraction and insertion of a fire tube associated with a heater treater is disclosed that includes extending an elongate shaft coupled to a powered machine into an opening of the fire tube, engaging the elongate shaft with an internal surface of the fire tube, moving the fire tube relative to the heater treater while the elongate shaft is engaged with the fire tube, and preventing rotation of the fire tube prior to and during moving the fire tube relative to the heater treater.

In certain embodiments, preventing rotation of the fire tube may include securing the fire tube to a stabilizer.

In certain embodiments, engaging the elongate shaft with the internal surface of the fire tube may include engaging at least one extender from the elongate shaft with the internal surface of the fire tube.

In certain embodiments, the at least one extender may be movable between an extended position and a retracted position normal to a longitudinal axis of the elongate shaft.

In certain embodiments, moving the fire tube relative to the heater treater may include positioning the fire tube relative to the heater treater, e.g., inserting and/or extracting the fire tube from the heater treater.

Although this specification discloses advantages in the context of certain illustrative, non-limiting embodiments, various changes, substitutions, permutations, and alterations may be made without departing from the scope of the appended claims. Further, any feature described in connection with any one embodiment may also be applicable to, or combined with, any other embodiment.

What is claimed:

1. An implement for extraction and insertion of a fire tube associated with a heater treater, said implement comprising:
    an elongate shaft comprising an exterior surface and a longitudinal axis;
    an extender carried by the elongate shaft, the extender moveable between an extended position and a retracted position normal to the longitudinal axis of the elongate shaft, a portion of the extender outwardly disposed from the exterior surface of the elongate shaft when the extender moves toward the extended position, the elongate shaft further including a mounting end and an insertion end opposing the mounting end, the insertion end being configured to be received within an opening of the fire tube;
    an actuator configured to move the extender between the retracted position and the extended position, and to cause the extender to engage the fire tube when in the extended position; and
    a stabilizer positioned proximate the mounting end of the elongate shaft and laterally disposed from the exterior surface of the elongate shaft, the stabilizer including a grasping arm pivotally positioned relative to the elongate shaft.

2. The implement according to claim 1, wherein the stabilizer includes a tethering device.

3. The implement according to claim 1, further comprising a frame, the stabilizer and the mounting end of the elongate shaft being coupled to the frame.

4. The implement according to claim 1, further comprising a frame, the mounting end of the elongate shaft coupled to the frame and the insertion end of the elongate shaft extending outward from the frame.

5. The implement according to claim 1, further comprising a frame, the frame configured to be coupled between the elongate shaft and a powered machine.

6. The implement according to claim 1, wherein the exterior surface of the elongate shaft is configured to be slidably received within an opening of the fire tube when the extender is moved toward the retracted position.

7. The implement according to claim 1, wherein the elongate shaft includes an internal housing, the extender and the actuator being positioned within the internal housing.

8. The implement according to claim 7, wherein the extender is moveably coupled in the internal housing of the elongate shaft.

9. The implement according to claim 7, further comprising an extender aperture disposed through the exterior surface and into the internal housing of the elongate shaft, wherein the extender is configured to extend through the extender aperture when the extender moves toward the extended position.

10. The implement according to claim 7, further comprising a carrier, wherein the actuator and the extender are coupled to the carrier, the carrier configured to be received within the internal housing of the elongate shaft.

11. The implement according to claim 1, wherein the extender is a plurality of extenders positioned substantially equidistant about the longitudinal axis of the elongate shaft.

12. The implement according to claim 1, wherein the extender includes a plurality of extenders positioned along a length of the elongate shaft.

13. The implement according to claim 1, wherein the extender resides below the exterior surface of the elongate shaft when the extender is in the retracted position.

14. The implement according to claim 1, wherein the extender carries an engagement shoe configured to engage an internal surface of the fire tube when the extender moves toward the extended position.

15. The implement according to claim 1, further comprising a linkage coupled between the actuator and the extender, wherein the actuator is operable on the linkage for moving the extender between the retracted position and the extended position.

16. The implement according to claim 15, wherein the actuator includes an actuator housing and an actuator rod linearly moveable relative to the actuator housing, the actuator rod coupled to the linkage.

17. The implement according to claim 16, further comprising a carrier, wherein the actuator housing is coupled to the carrier, and wherein the actuator rod is linearly moveable relative to the carrier and the extender is pivotal relative to the carrier.

18. A method for extraction and insertion of a fire tube associated with a heater treater, said method comprising:
    extending an elongate shaft coupled to a powered machine into an opening of the fire tube;
    engaging an extender from the elongate shaft with an internal surface of the fire tube;
    moving the fire tube relative to the heater treater while the extender is engaged with the fire tube; and
    preventing a rotation of the fire tube prior to and during moving the fire tube relative to the heater treater, wherein preventing rotation of the fire tube includes securing the fire tube to a stabilizer, the stabilizer being laterally disposed from the elongate shaft and positioned exterior to the opening of the fire tube.

19. An implement for extraction and insertion of a fire tube associated with a heater treater, said implement comprising:
- an elongate shaft comprising an exterior surface and a longitudinal axis;
- an extender carried by the elongate shaft, the extender moveable between an extended position and a retracted position normal to the longitudinal axis of the elongate shaft, a portion of the extender outwardly disposed from the exterior surface of the elongate shaft when the extender moves toward the extended position;
- an actuator configured to move the extender between the retracted position and the extended position, and to cause the extender to engage the fire tube when in the extended position; and
- a linkage coupled between the actuator and the extender, wherein the actuator is operable on the linkage for moving the extender between the retracted position and the extended position, wherein the actuator includes an actuator housing and an actuator rod linearly moveable relative to the actuator housing, the actuator rod being coupled to the linkage.

20. The implement according to claim 19, further comprising a stabilizer positioned proximate a mounting end of the elongate shaft and laterally disposed from the exterior surface of the elongate shaft, wherein the stabilizer includes a grasping arm pivotally positioned relative to the elongate shaft.

21. The implement according to claim 19, wherein the extender includes a plurality of extenders positioned along a length of the elongate shaft.

22. An implement for extraction and insertion of a fire tube associated with a heater treater, said implement comprising:
- an elongate shaft comprising an exterior surface and a longitudinal axis;
- an extender carried by the elongate shaft, the extender moveable between an extended position and a retracted position normal to the longitudinal axis of the elongate shaft, a portion of the extender outwardly disposed from the exterior surface of the elongate shaft when the extender moves toward the extended position;
- an actuator configured to move the extender between the retracted position and the extended position, and to cause the extender to engage the fire tube when in the extended position;
- a linkage coupled between the actuator and the extender, wherein the actuator is operable on the linkage for moving the extender between the retracted position and the extended position, wherein the actuator includes an actuator housing and an actuator rod linearly moveable relative to the actuator housing, the actuator rod coupled to the linkage; and
- a carrier, wherein the actuator housing is coupled to the carrier, and wherein the actuator rod is linearly moveable relative to the carrier and the extender is pivotal relative to the carrier.

23. The implement according to claim 22, further comprising a stabilizer positioned proximate a mounting end of the elongate shaft and laterally disposed from the exterior surface of the elongate shaft, wherein the stabilizer includes a grasping arm pivotally positioned relative to the elongate shaft.

24. The implement according to claim 22, wherein the extender includes a plurality of extenders positioned along a length of the elongate shaft.

\* \* \* \* \*